(No Model.)
W. D. SHERMAN.
SAW SWAGE.
No. 326,164. Patented Sept. 15, 1885.
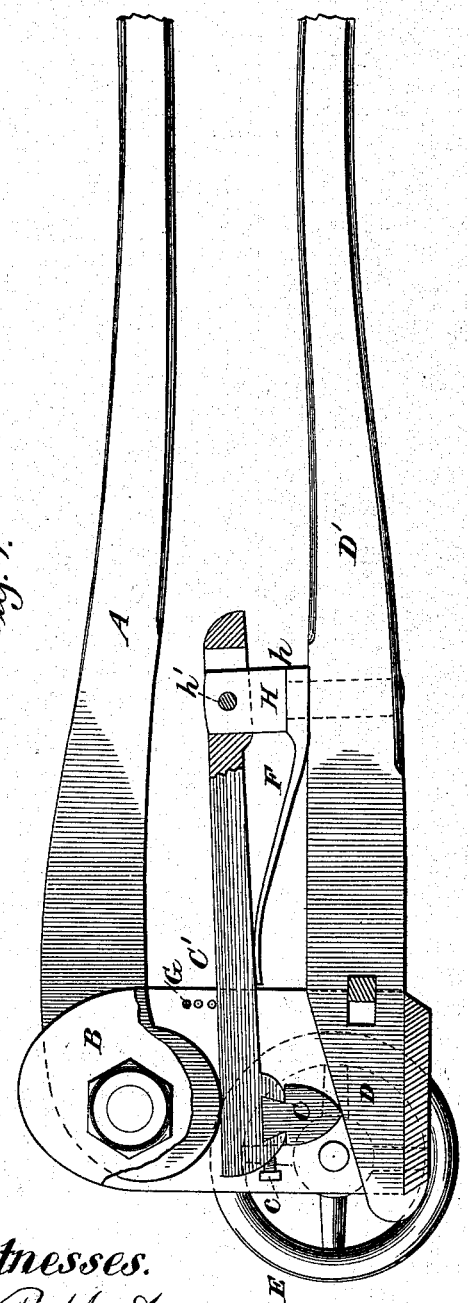
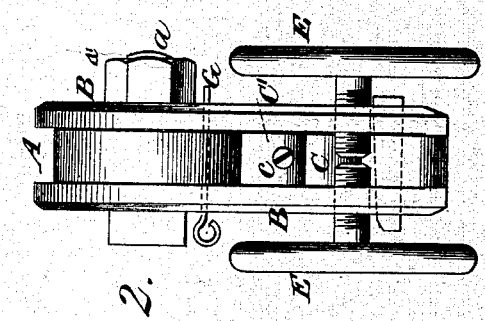
Witnesses.
A. Ruppert
Alfred T. Gage.
Inventor:
Wallace D. Sherman
Per
Thomas P. Simpson
Attorney

UNITED STATES PATENT OFFICE.

WALLACE DANEL SHERMAN, OF GRAND RAPIDS, MICHIGAN.

SAW-SWAGE.

SPECIFICATION forming part of Letters Patent No. 326,164, dated September 15, 1885.

Application filed March 30, 1885. (No model.)

*To all whom it may concern:*

Be it known that I, WALLACE D. SHERMAN, of Grand Rapids, in the county of Kent and State of Michigan, have invented an Improved Saw-Swage, of which the following is a specification.

Figure 1 of the drawings is a longitudinal sectional elevation. Fig. 2 is a front elevation.

The invention will first be described in connection with the drawings, and then pointed out in the claims.

In the drawings, A represents a lever fulcrumed on a pivot-screw, $a$, which carries a nut, $a'$, and is headed at the opposite end. B is a U-shaped yoke, between whose sides the lever turns; C, a swage held under the front end of a pivoted bar, $C'$; D, an anvil in a handle or holder, $D'$. F is a spring, which raises the swage C from the anvil D, and E E are gage-screws, which hold the saw-tooth securely in position for being operated upon. H is a headed bolt passing up through the handle D, spring F, and swage-holder $C'$, shouldered at $h$, in order to clamp the spring end to the handle $D'$, and pivoted to the swage-holder $C'$ at $h'$.

All the parts are made of cast-steel, so as to be light and durable, the whole weighing less than six pounds when ready for use, and costing less than one-fourth of the price now paid for devices of a similar kind.

One great advantage of my invention is, that it does not require the removal of the saw from its arbor or hanging position. Another is, that when the tooth is on the middle of the anvil both corners are spread alike, while the tooth is slightly elongated, so as to require but little filing. If a tooth requires a little more swaging on one side than on the other, the tooth-clamps E E are adjusted so as to hold the tooth a little to one side of the middle of the anvil or stationary bottom die, D. The swaging-die C undergoes some wear, and requires occasionally to be dressed off. If the swage does not come squarely down on the anvil after the "dressing," then the screw $c$ should be retracted, a little packing inserted, and then tightened. The dies will then work like perfectly new ones.

This hand implement is used as follows: It is brought up to the saw so that one tooth will come between the gage-screws E E and on the desired part of the anvil. Then the screws are made to clamp it securely. Then the left hand holds the handle $D'$, while the right hand brings down the lever A from a perpendicular position to a horizontal one, as shown in Fig. 1 of the drawings. The tooth is then unclamped and the others treated successively in the same way.

Having thus described all that is necessary to a full understanding of my invention, what I consider new, and desire to protect by Letters Patent, is—

1. A hand-swage for saws, consisting of the cam-lever A, yoke B, swage C in pivoted spring-holder $C'$, standard H, anvil D in holder $D'$, and clamp E E, all combined, constructed, and arranged substantially as and for the purpose specified.

2. The combination, with a swage, C, and anvil D, of the two clamp-screws E E, all relatively arranged as shown and described.

3. The combination, with the parts $C'$ $D'$ F, of the standard H, passing up through said parts, having shoulder $h$, and provided with pivot $h'$, as and for the purpose specified.

WALLACE DANEL SHERMAN.

Witnesses:
I. W. HOLCOMB,
R. H. CHILSON.